(12) United States Patent
Krishnamurthy et al.

(10) Patent No.: US 10,637,772 B2
(45) Date of Patent: Apr. 28, 2020

(54) VERIFICATION MECHANISM FOR NETWORK SERVICE CHAIN PATHS

(71) Applicant: Guardtime IP Holdings Limited, Tortola (VG)

(72) Inventors: Hema Krishnamurthy, Phoenix, AZ (US); Jeffrey Pearce, Hilo, HI (US)

(73) Assignee: Guardtime SA, Lausanne (CH)

( * ) Notice: Subject to any disclaimer, the term of this patent is extended or adjusted under 35 U.S.C. 154(b) by 273 days.

(21) Appl. No.: 15/167,994

(22) Filed: May 28, 2016

(65) Prior Publication Data
US 2017/0346752 A1    Nov. 30, 2017

(51) Int. Cl.
*H04L 29/06* (2006.01)
*H04L 12/725* (2013.01)

(52) U.S. Cl.
CPC .................................. *H04L 45/306* (2013.01)

(58) Field of Classification Search
CPC ............................... H04L 47/34; H04L 45/306
USPC ............................................................. 726/3
See application file for complete search history.

(56) References Cited

U.S. PATENT DOCUMENTS

| | | | | |
|---|---|---|---|---|
| 2006/0179312 A1* | 8/2006 | Kelly | ................... | H04L 63/0807 713/169 |
| 2010/0077013 A1* | 3/2010 | Clements | ............ | G06F 16/1748 707/822 |
| 2012/0201248 A1* | 8/2012 | Aoki | ...................... | H04L 1/1809 370/394 |
| 2012/0284523 A1* | 11/2012 | Kolesnikov | ........... | H04L 9/0643 713/181 |
| 2014/0164352 A1* | 6/2014 | Denninghoff | ............ | H03H 9/25 707/711 |
| 2015/0195197 A1* | 7/2015 | Yong | ....................... | H04L 45/74 370/392 |
| 2015/0236948 A1* | 8/2015 | Dunbar | .................... | H04L 45/22 370/225 |
| 2016/0094667 A1* | 3/2016 | Jani | ......................... | H04L 67/16 709/202 |
| 2016/0134531 A1* | 5/2016 | Assarpour | ............... | H04L 45/74 370/392 |
| 2016/0241460 A1* | 8/2016 | Wan | ........................ | H04L 45/34 |
| 2016/0301632 A1* | 10/2016 | Anand | ................... | H04L 47/125 |
| 2016/0352629 A1* | 12/2016 | Wang | .................... | H04L 45/306 |
| 2017/0093698 A1* | 3/2017 | Farmanbar | .............. | H04L 45/38 |
| 2017/0163425 A1* | 6/2017 | Kaliski, Jr. | ........... | H04L 9/3242 |
| 2017/0195257 A1* | 7/2017 | Annaluru | .............. | H04L 49/253 |

* cited by examiner

*Primary Examiner* — Eleni A Shiferaw
*Assistant Examiner* — Sakinah White Taylor
(74) *Attorney, Agent, or Firm* — Jeffrey Pearce

(57) ABSTRACT

Data packets passing from a source to a destination in a network according to a Service Function Chain (SFC) are processed by an ordered sequence of at least one service function (SF). For each SF in the SFC in order, a current value of a function, such as a hash function, is recursively computed including, as input values, at least current identifying data that identifies a corresponding current one of the SFs, and a value of the function output from an immediately preceding SF. After computing the current value of the function for a selected SF in the SFC, the current value of the function is compared with an expected value. If the value of the function for the selected SF is the same as the expected value, the data packet is allowed to be transmitted to a subsequent processing stage; if not, then an error response action is taken.

29 Claims, 4 Drawing Sheets

VERIFICATION MECHANISM FOR NETWORK SERVICE CHAIN PATHS

FIELD OF THE INVENTION

This invention relates to a system and methods for verifying correct packet processing in a chain of network service functions.

BACKGROUND

Because of the efficiency of modern networks, most users of networks such as the Internet or mobile phones assume that their communication is essentially point-to-point, such as laptop-to-server or phone-to-phone. They know there is some form of router or service provider or cell phone tower in between, but otherwise they generally may remain happily unaware of the complexity of functions performed on the data packets they are creating, transmitting and receiving, the paths the packets take to have these functions performed or, indeed, for most users, that there are packets involved at all.

In the context of network-based data transmission, a packet is generally understood to be a body of data that traverses a network as a unit, as opposed to a continuous bit stream. Larger data sets may be subdivided, either as a function of time, or of size, or both, into packets, which carry the data of the larger set. In some other situations, packets are created as primary data carriers, independent of any larger data set. In either case, packets also typically carry metadata that relate to the packets themselves and usually the path they take through the network from their respective insertion or origin points to their endpoints.

Packets may, and usually are, processed in any of a great number of different ways on their route from their source to their destination. Each such processing stage is normally referred to as a "service function" (SF). An SF is thus a network function that provides any form of either transformation or other value added service. Deep Packet Inspection, a firewall, an IP Network Address Translator (NAT), a load balancer, Intrusion Defense and Intrusion Prevention Systems (IDS/IPS), and Lawful Intercept (LI) are just a few of the almost countless examples of SFs, many more of which may be defined by the system administrator.

As a packet moves through a network, it may encounter one or more such SFs in order. The ordered set of SFs and any ordering constraints that are to be applied to a given packet is known as its Service Function Chain (SFC), sometimes referred to more simply as its "service chain," and sometimes also referred to as a VNFFG (Virtual Network Function Forwarding Graph). The SFC represents an evolution toward interconnected, orchestrated, and automated software-defined networks and network virtualization function implementations. The packet path defined by a SFC from an initial logical position ("source") at a first node to a destination need not be strictly linear; rather, a packet path may be branched, either conditionally or as a result of packet copying, path branches may merge, and it is even possible for a SFC to define a path that leads through a given node and SF more than once.

In some cases, each SF is performed by a separate node, such as a different server. In other cases, more than one SF is performed in a single node, for example, simply as parts of a single routine, or by separate virtual machine instances, etc.

It is typically required for the source-to-destination flow of data packets to follow a clearly defined path through the network. Even where not required, it is at least usually preferable to know that path. For example, packets may be specified to go through a performance optimizer, then a firewall, then a load balancer, and maybe a VPN server before reaching a destination server. Troubleshooting flow errors is at present difficult, often uncertain, and usually slow, especially inasmuch as it is usually manual: when an anomaly is detected in the chain, in current systems, the point of failure is not automatically flagged. The degree of troubleshooting complexity increases greatly in environments in which several co-existing tenants/clients, each with their own separate SFC requirements, may dynamically need to change the SFC routing and the SFs involved.

What is needed is a way to more efficiently verify the flow of packets as they follow a SFC through a network.

DETAILED DESCRIPTION

Figure 1:
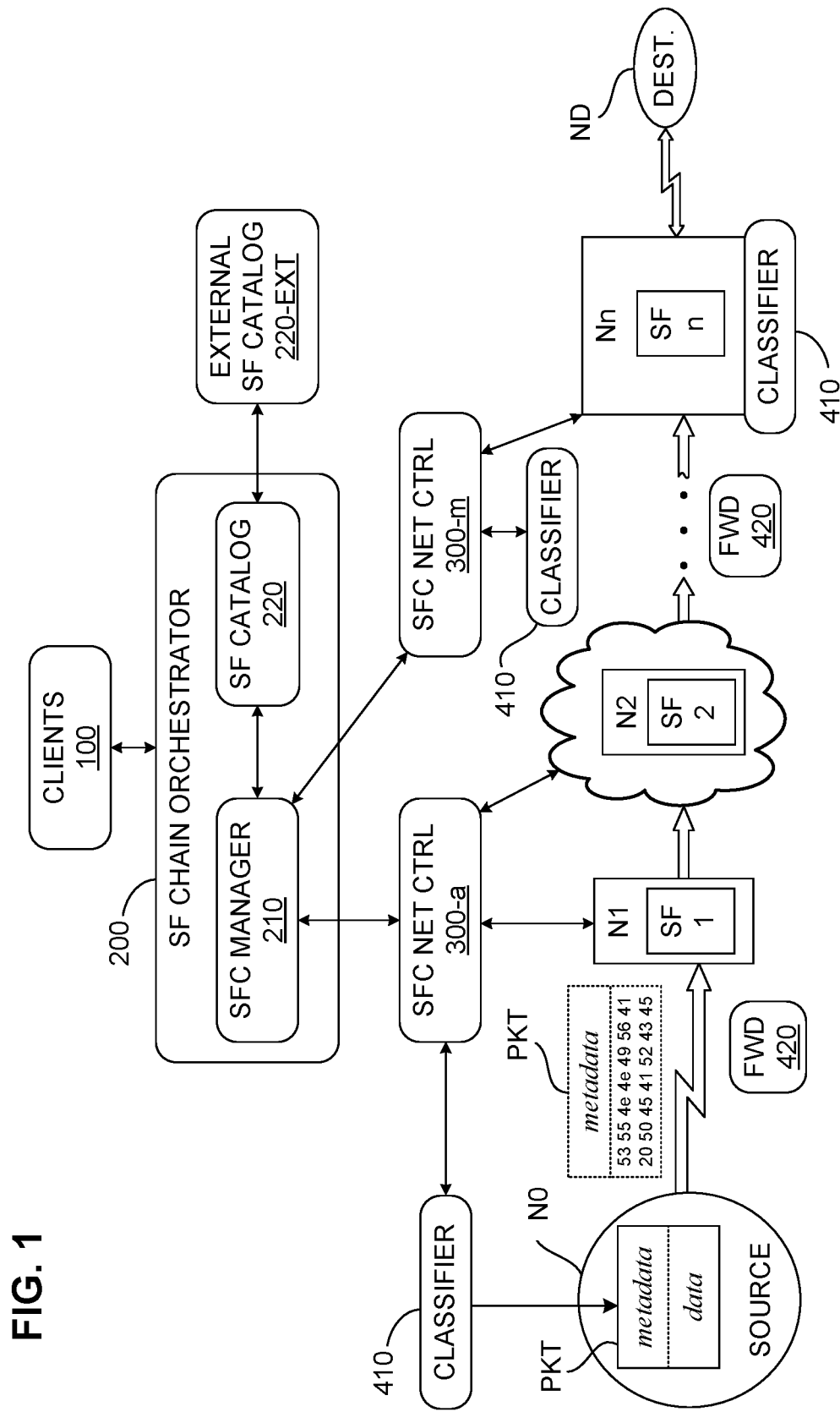
FIG. 1 illustrates the main components typically found in a service function chaining architecture.

FIG. 1 illustrates the main components typical found in a network in which packets PKT are sent according to a service function chain (SFC) from an initial, source node N0, possibly via one or more intermediate nodes N1, N2, . . . , Nn, to a destination node ND. Along the way, a packet may be processed according to one or more service functions (SF). Although illustrated as one-SF-per-node, this is for the sake of simplicity and not necessity; rather, a single node may perform any number of service functions.

Nodes may be of any type or mixture of devices, which may be physical and/or virtual. As just one example, the source node N0 could be a user's computer, the destination node ND could be a server that is hosting a web site, and intermediate nodes could be a combination of physical and virtual servers (or any form of "virtual machine" in general), routers, switching devices, etc. As another example, the source node could be a telecommunications device such as a user's smart phone, the destination node could be another smart phone or a web hosting server, and the intermediate nodes could include servers associated with cellular signal reception towers, packet-switching servers, GSM registries, etc.

The connections between nodes, which may be local and known, or remote (even in the "cloud"), may be hard-wired, or wireless, or a combination. The only assumption is that packets can be transmitted from node to node, from source to destination.

Different network architectures will naturally have different components, and in some architectures, some of the different functions of the components that are shown in FIG. 1 may be combined into individual processing entities or even omitted. The components shown in FIG. 1 serve to explain the general context in which embodiments of the invention may be used.

Although not found in some implementations, clients 100 are entities that may issue requests or set requirements for certain packet services, possibly also specifying preferred or required packet flow paths. Clients need not be entities that are external to the rest of the service chain architecture, but rather could also be processes within other components of the architecture itself.

Although it would be possible to specify different SFCs for each of a set of related data packets, this is seldom efficient; rather, a common SFC is usually designated for a set of packets, for example, corresponding to a single transmission request from a client, or to some block of data packets designated by the client. In the example below, reference to "a" or "the" packet is therefore for the sake of succinctness; typically (but not necessarily) the same procedure and same SFC may be used for multiple packets.

An SF chain orchestrator 200 defines SFC flow paths either according to internally programmed rules or heuristics, or converts client requests, preferences and requirements into possible flow paths. The orchestrator 200 often includes an SFC manager 210 and an SF catalog 220. The SF catalog 220 stores and maintains a list of the SF instances that are currently available in the network. After determining a specified or requested SF chain, the SFC manager 210 may then query the SF catalog 220, and/or an external SF catalog 220-EXT, to determine if SFs are available to create the needed SFC path. If not, then any desired action may be taken, for example, simply not allowing the corresponding packet onto the network, or choosing some other SFC according to any pre-set back-up protocol. If the SFs are available, the SFC manager 210 may pass the list of SFs and their order to one or more net controllers 300-a, . . . , 300-m (referred to collectively as 300).

Each network controller 300 is responsible for establishing the required SFC path. As part of this process, the net controller may communicate with a classifier 410, which classifies traffic flows based on policies often contained in an SFC policy table and inserts an SFC header containing a path ID into the flow packet PKT headers. The classifier is typically a logical entity, which may therefore run either on a separate processing system, or within the processing system of one of the other components, such as a net controller 300 or within a node itself, such as node Nn. The network controller(s) 300 also directs the classifier(s) 410 to program one or, usually, more, SF forwarders 420, which steer the flow of the data packet(s) PKT through the sequence of SF instances by receiving the packets and forwarding them to the associated SF instances using information in the packet header.

The orchestrator 200, the network controller(s) 300, the classifier(s) 400, and the SF forwarders 420 may be viewed as being part of an overall control plane for the network. As such, two or more of the various illustrated components of this control plane may, depending on the implementation, be combined into a single entity, especially where the components are logical, or their functions may be further divided into portions that are performed by different entities.

Data packets are intended to convey some form of information from the source to the destination. As FIGS. 1 and 2 indicate, and as is well known, each packet will include two main bodies of information, which may be roughly called the "data" or "payload", and "everything else". The data portion data generally means the digital information that the source needs to convey to the destination; the information in what here is shown as the metadata is the portion that conveys information about the packet and the transfer.

Typical metadata in the context of networks such as the Internet include such information as the IP addresses of the source and destination. In telephone networks, metadata may include identifiers of the source phone and destination, identifiers for the respective service providers, a range of client identifiers, local and global registries, etc. In the context of embodiments of this invention, in particular, SFCs, "metadata" means, or at least includes, the information added to a packet to be carried along with the packet for the consumption of the service function nodes along the SFC. In particular, in embodiments of the invention, information is included in the metadata that identifies the SFC for the packet. Metadata could thus include such information as a service function chain ID, an index value indicating at which point (node, SF, or other) in the specified SFC the packet the index in the chain is, an application ID, a subscriber ID, the tenant ID, policy pertaining to the current packet type or service chain or any other information the system designer may choose to include in a given implementation. Note that one advantage of embodiments of the invention is that hashes and other identifiers pertaining to individual tenants can be stored independently within the controller.

This SFC-identifying information may be arranged in any preferred manner. One option is to define the chain in terms of an ordered series of SF identifiers. Another option would be to define the chain as a series of tuples, each including not only an SF identifier, but also an identifier of the node on which it is to be performed. Yet another option would be for there to be a set of whole-SFC identifiers, each corresponding to a complete SF/node "route" from the source to the destination. For the different embodiments of this invention, all that is necessary is that, at each SF and/or node the packet is to pass through (including optional paths), some digital information is inserted into the packet's metadata, whether in the "header" and/or "trailer" or otherwise, that corresponds to the SF, or the node, or both, or to some other function that corresponds to some other aspect of the SFC the packet is intended to transit. For purposes of illustration, assume that this digital information is the node- or SF-specific information and is included as, or as part of, state information S.

Here, the concept of "state information" need not be the same as information about the total state of an SF or node, but rather simply the information that is to be used in the verification computations described below. Note that the state information S may include not only information that identifies a given SF and/or node, but other information as well. Thus, state information S may include static, SF/node-specific, and general information. Static information may be parameters made available to the source from the start of the packet transmission and that is assumed not to change from source to destination, such as a latest allowable time for completion of the SFC, information indicating a level of priority or classification, an SFC identifier or client ID, a parameter indicating the total number of SFs to be passed, etc. An example of SF/node-specific information may be information created or added by a particular SF or node itself, such as to confirm its identify. The SF- (and/or node-) identifying state information may be chosen in any manner, and may include, for example, simply a pre-assigned ID number of the respective SF. Examples of general state information that a system designer might choose to include could be a time indication.

Simply to illustrate the main inventive feature of the invention, assume a packet PKT is to move from the source node N0 to the destination node ND according to a SFC that specifies processing en route by service functions SF1, SF2, . . . , SFn; and let Sj indicate the relevant identifying state information for SFj, that is, whatever information is chosen to correspond to and indicate the respective SF.

Figure 2:
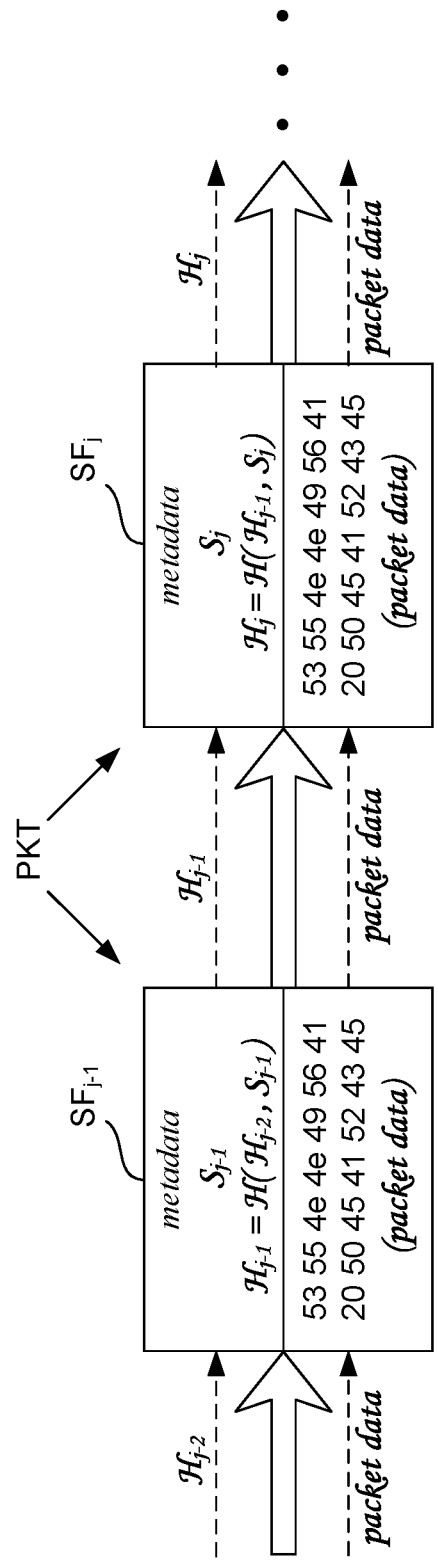
FIG. 2 illustrates hash-chaining of packet headers.

See FIG. 2, which illustrates a packet PKT as it is received for processing by a service function $SF_{j-1}$, then passed onward for processing at a next service function $SF_j$. In embodiments of the invention, the state information Sj at each service function $SF_1$ is recursively combined with state information of previous nodes. Thus, the node that performs $SF_j$ computes a function $H_j=H(H_{j-1}, S_j)$, where $H_0$ may be computed as $H_0=H(null, S_0)$ or as any other starting value, which may be included in the definition of the initial state $S_0$ of the packet PKT in the source node. Thus, in one sense, the initial creation of the packet PKT may be considered to be the first service function, that is, an SF0, with identifying state information $S_0$ included in the packet's metadata. The final value $H_j$ in the SFC chain of function computations may be evaluated either in the destination node ND, if that is the node performing the last service function $SF_n$ in the chain, or in whichever node performed $SF_n$. Passing of the packet to its destination therefore does not necessarily imply that the entity that comprises the destination cannot itself perform some final SFs on the packet before doing so. All that is required is some final H value may be computed that is a function of the SFs in the specified SFC, and of any other information that is known to the control plane so that it can compute its expected final H value.

Any function may be used as the function H, but it should be repeatable, such that, given identical inputs, H(a, b, ...) it should return the same value each time it is evaluated. The function H should preferably also have a range that is great enough and distributed in such a way that it is very unlikely that any one chain of SFs would lead to the same final H value as any other. To avoid unacceptable additional latency, it should preferably be possible to compute H quickly. One option would be for H to be a pseudorandom number generator that uses each $(H_{j-1}, S_j)$ as a seed. To make later recomputation easy, the same algorithm should preferably be used at each computation step.

In the preferred embodiment, H is chosen to be a cryptographic hash function, for example, of any of the common SHA-x or MDx hash function classes. These functions have all the preferred characteristics mentioned above, plus the features of being, in practice, non-invertible and non-commutative. They are also well-known, such that the same function can be used at each SF, and may also be used system-wide, in particular, in the control plane components.

Now recall that the network controller(s), or some other component in the control plane, will have specified all, or at least some portion of, the SFC before the packet PKT was transmitted from the source node NO. As such, the controller will also know each SF in the specified SFC, as well as the identifying state information for each SF in the chain. The SFC can be specified "all-at-once", that is, identifying all the SFs in the chain from source to destination, or the SFC could be specified in segments, such that it is initially specified from the source through to, for example, SFm, and then the packet's onward processing path can be specified at that point. Onward processing from SFm might, for example, be conditional on some result of processing at SFm or other external conditions, such as a need to re-route the packet in flight. In any case, the controller (or other control plane component) will have, or will be able to compile, a list of all the SFs the packet is supposed to pass through, as well as the identifying state information for those SFs.

Consequently, given the identifying state information for, for example, SF0, SF1, ..., SFm, and assuming that H is known for each computation, the controller will also be able to compute $H_{m-1}$. In particular, if SFn is the final SF in the current SFC, then the controller will be able to compute the final $H_n$ value, that is, the value at the "end" of the SF chain. Moreover, since the SFC chain will be known to the controller before the packet PKT completes it, the controller will be able to compute $H_n$ even before the packet has reached the destination, or at any time from when SFC is first determined onward.

At any time after the packet has completed the final SFn, either upon reaching the destination or before, as a condition of doing so, the controller may receive the final $H_n$ value, for example from a classifier associated with the node in which it is computed, and compare that value with its own expected final value $H_e$, which it may either already have computed and stored, or may compute at that time. The "final" value $H_n$ at the end of the service chain can either be synchronized back to the controller, or the controller can query the final classifier node (before the packet is delivered to destination) to ensure that the expected service path for a given client's packet(s) wasn't bypassed.

Once the controller receives the final value $H_n$, it may compare it with the value $H_e$ that would be expected. If $H_n \neq H_e$ the system will know that the packet did not properly complete all of the service functions in the chain SFC and may then take any designed error response action, such as simply dropping the packet, not allowing the packet to be transmitted to the destination, initiating a fault-detection procedure, etc. For example, the controller may signal that the packet must be re-sent, either via the same SFC or a revised SFC.

Although useful and sufficient in many contexts, in other optional embodiments it is not necessary to wait until the destination node, or just before, to compare a current cumulative hash value $H_c$ with what it should be, that is, with an expected value $H_{ce}$. In one such embodiment, a vector of one or more, and preferably all, previous hash values is built up and included in the packet header (or other data field). In other words, at SF1, $H_0$ may be included, and $H_1$ is appended. At SF2, the hash vector will include $\{H_0, H_1\}$ and $H_2$ is appended to form the hash vector $\{H_0, H_1, H_2\}$. At SFm, the hash vector will include $\{H_0, H_1, \ldots, H_{m-1}\}$ and $H_m$ is appended, and so on.

Now since the control plane will know the entire SFC, it will be able to compute, or pre-store, the expected value $\{H_{0e}, H_{1e}, \ldots, H_{(m-1)e}, \ldots\}$ for each hash value at every SF. The node that hosts SFj, for example, may therefore be programmed to transmit to the control plane (for example, the net controller) the current hash value $H_j$, which the control plane may then compare with the expected value $H_{je}$. If these are not identical, then the control plane will know that some part of the SFC has not been followed or computed properly. Something is wrong. The control plane may then, for example, signal to the node to drop the packet, or may signal the destination node not to accept it and/or it may signal the source to re-send the packet, or it may take any other preventative or corrective action.

One other advantage of this arrangement is that it will be easy for the control plane to determine at what SF (or between what two SFs) in the specified SFC either the packet has deviated from the SFC, or some calculation or operation within an SF or node is incorrect: the error will have occurred somewhere from the point where the current hash value was last known to be correct up to where it has been detected to be incorrect. Furthermore, since different service functions may span different domains, this method also offers efficient troubleshooting on a domain-separation level.

Figure 3:
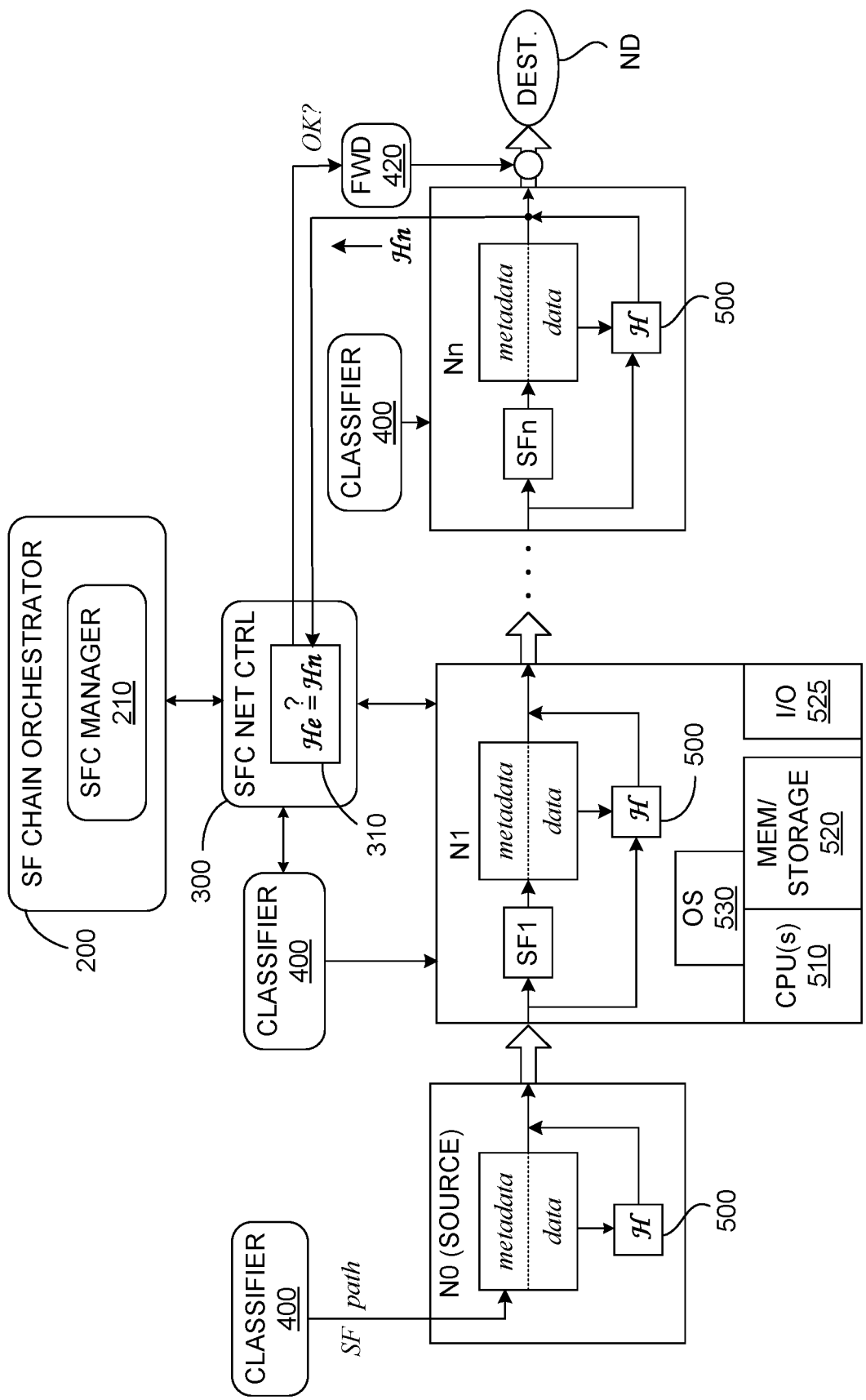
FIG. 3 shows an example of a configuration of components arranged to implement header hash-chaining.

See FIG. 3, which shows a partially simplified version of FIG. 2, but with greater detail as to some other components.

Consider first node N1, which is representative of the other nodes as far as to its general hardware and software structure. As FIG. 3 illustrates, each node will generally include one or more processors 510, as well as some combination system memory and non-volatile storage 520. One or more I/O units 525, such as network interface circuitry, will be included to receive and transmit information over the network(s), in particular to and from other nodes and control plane components, communicate with peripherals as needed, etc.

Each node will also include some form of system software 530, generally including an operating system and any drivers as needed, for example, to interact with peripheral devices. Applications may run on the hardware under the control of the system software. Similar hardware and software components will be found in the other processing systems, including those that form the control plane, source and destination, as is usual. The system software, as well as applications, including the specialized modules described below, will be embodied as processor-executable code that is stored in the non-transitory storage media in the respective systems and loaded into memory for execution by the processors. The code itself may be pre-loaded, downloaded from an external source, input from a portable storage medium such as a disk, thumb drive, etc., and some or all of the code execution may be done remotely, such as would be the case with cloud computing.

Within each node that performs one or more service functions, a software module 500 is included that computes the function H given the H value from the previously completed SF and the identifying information of the SF being performed at this point. It then inserts the new H value into the metadata of the packet, which then passes onward either for processing by a subsequent SF, or for final evaluation of correctness and transmission to the destination ND.

Within at least one of the components of the control plane, such as a controller 300, an evaluation module 310 is included, which receives at least one of the function values H and then compares it with what it is expected to be. In one embodiment, only a single, final evaluation is performed. In other words, in that embodiment, the final value $H_n$ is compared with the expected value $H_e$. If the values are equal, then the system will have confirmed that the packet, or the packets for the corresponding client (if all a client's packets are otherwise constrained to pass through the same processing path), has completed all of the specified SFs in the chain SFC. The controller may then transmit a signal to, for example, a forwarder 420, indicating (shown as "OK?") whether to allow the packet to pass to the destination. If not, then the controller may also signal the orchestrator 200 to either try to have the packet re-sent, to send an error message to the corresponding client, to try a different route, or take any other error response action.

The comparison operation between H values can be triggered in different ways. For example, as mentioned above, the final node in each specified SFC may be programmed to signal the controller 300 when the final SF has been completed. Alternatively, the controller can query the final classifier node to request the final $H_n$ value.

In the example illustrated in FIG. 3, it is the final value $H_n$ that is compared with the expected value $H_e$. In other embodiments, the chained H computation is checked not only after the final SF, but also at one or more intermediate SFs. This will normally represent a trade-off between transmission speed and fault-detection granularity. In other words, the more the packet's path through the specified SFC is tested, the slower transmission will be, but the faster, that is, the earlier in the SFC, the system will detect that the packet did not follow the proper SF processing sequence. For example, assume that the first (m−1) SF instances occur within a logical boundary known to have highly reliable or secure network transmission characteristics, but the SF instance SFm is outside the boundary, and then SF(m+1), SFn are again within the boundary. The controller could in such case compute an expected H value $H_{em}$ after completion of SFm, request or receive the actual $H_m$ from the node hosting SFm, and compare those. If there is a mismatch, the controller can halt continued packet processing and take any desired action in response.

It would also be possible to test H values dynamically. For example, assume that the controller, or some other control plane component, detects a network anomaly, such that continued successful processing of the packet is less likely than some acceptable minimum. The controller could then request and test intermediate H values from more nodes, and then return to a less intrusive protocol when the anomaly is gone.

Figure 4A:
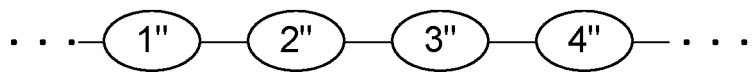
FIGS. 4A-4E illustrate examples of various types of service function chain paths.

In FIGS. 1 and 3, the SFC chain is shown as being "linear", that is, there is exactly one specified SF following the source, and each SF thereafter, until the packet reaches the destination. This is the configuration illustrated in FIG. 4A, where service functions SF1, SF2, SF3, SF4, . . . are illustrated simply as ovals labeled 1",2", 3",4".

Figure 4B:
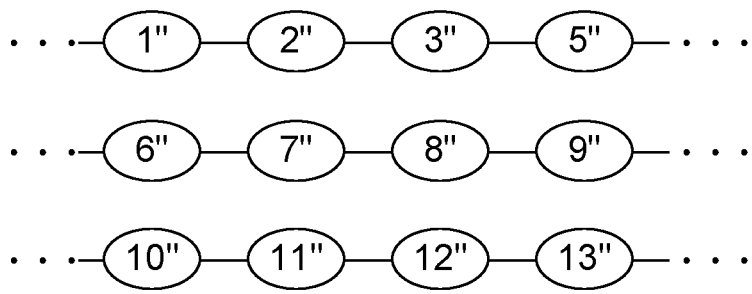
Figure 4C:
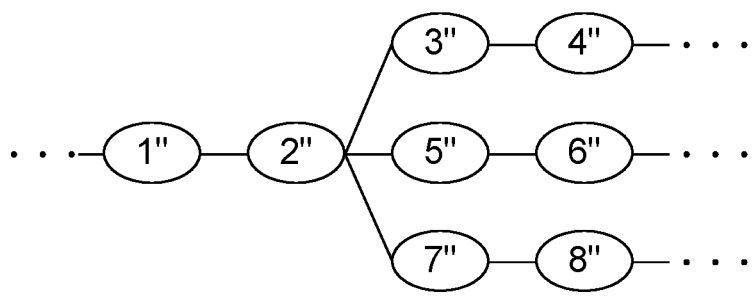
Figure 4D:
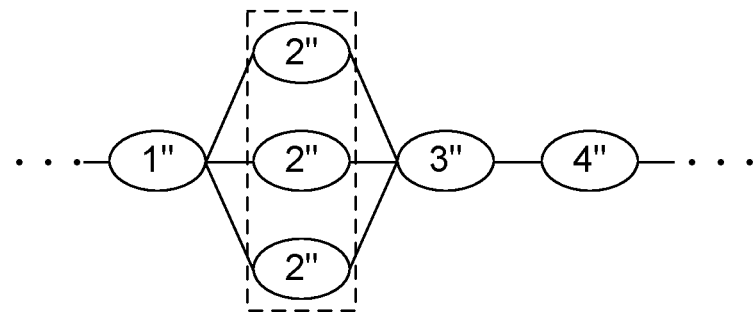

Other SFC configurations are possible. FIG. 4B shows an SFC configuration that has multiple chains, an example with three parallel SF paths { . . . , 1",2", 3",5", . . . }, { . . . , 6",7", 8",9", . . . } and { . . . , 10",11", 12",13", . . . }. In FIG. 4O, the SFC is partially linear, and then branches into multiple paths. FIG. 4D illustrates a configuration in which a required SF, namely 2", is carried out selectively by any of three different instances, which may be preferred, for example, for load balancing. Regardless of the SFC configuration, since it will be specified by the control plane, the controllers will know what the H value should be at any point in any point or branch of the SFC, such that the comparison module 310 can determine if an SF has been bypassed.

Figure 4E:
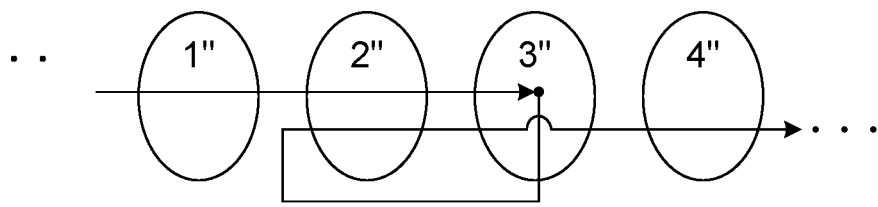

FIG. 4E illustrates yet another SFC path option, namely, one that includes a "loop", that is, a branch back to any previously completed SF. Looping back to a previously completed SF could occur for any of several reasons. For example, repetition of a particular SF could be part of the originally intended SFC. If each step of the SFC is indexed, then subsequent passes through the same SF will be distinguishable from the index. As another example, some event in the control plane might cause it to need to repeat a particular SF for a given packet, in which case the control plane could update the SFC in the packet header at its current node, causing a repeat of a previously completed SF. Looping back could also be caused by some condition in a current SF or node, in which case the node would signal the need for a change of SFC to the control plane, or simply the chosen path if a branch was already anticipated in the SFC, whereby the packet header's SFC data could be updated accordingly. Conversely, note that any unplanned loop back to any previous SF, or a hop of any intended SF, will be easily detectable since either deviation from the intended SFC will either omit or add one or more hash computations and thus lead to a different final value.

Embodiments of the invention efficiently detect deviation from a specified service function chain path and, depending on the system configuration, may even detect at what point in the SFC the deviation occurred, even where SF loops are in the SFC path. The invention provides a cryptographically sound way to prevent a malicious attacker from bypassing some nodes in the SFC and to prevent a malicious attacker from modifying the intended path. Embodiments achieve this by employing iterative hashes. For additional, optional security and/or verifiability where desired, the cumulative hashes of the metadata, the hash of policy pertaining to a given subscriber/tenant, hash of log information, etc., may be committed to a secondary verification system such as a blockchain, hash tree-based signature infrastructure, etc. The core idea of the invention supports service chains that are a multiple of several chains, branched SFCs, and SFCs designed for load balancing or other functions. When new value-added services are dynamically added to a SFC, the expected path (and hence the expected cumulative hash) may also updated at the control plane.

In implementations that require an especially high level of verifiability, one optional feature would be to make irrefutable, for example, a client's metadata, or the original source hash information, or any intermediate hash value, including hashes from intermediate service function nodes, or the state information of any or all of the nodes or SFs, or any combination of these or any other data that the administrator wishes to be made separately verifiable. One way to do this is to enter the information that is to be made verifiable, or some function thereof, as an entry into a blockchain, such as of the type used in Bitcoin-like infrastructures.

Another option is to sign such information using the hash tree-based infrastructure that has been developed by Guardtime As of Tallinn, Estonia, and which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"). One advantage of the Guardtime infrastructure is that it does not require reliance on keys. Another advantage is that, for each input data set to be signed, the signature allows for independent verification of a supposedly unaltered copy of the original data set. Yet another advantage is that the signature for initial state information (including, for example, client ID, etc.) could be included as part of a packet's metadata, assuming the packet and network bandwidth are large enough. Yet another advantage of the Guardtime signing infrastructure is that it intrinsically encodes time, such that the signature functions as a timestamp as well.

The invention claimed is:

1. A method for controlling the transmission of data packets over a network from a packet source to a packet destination, comprising:
   for each of at least one of the data packets:
     specifying a service function chain (SFC) that includes an ordered sequence of at least one service function (SF), each SF corresponding to a packet processing stage, and processing said SFs on a plurality of nodes;
   for each SF in the SFC in order, recursively computing a current value of a cryptographic hash function of both at least current identifying data that identifies a corresponding current one of the SFs, and a value of the cryptographic hash function output from an immediately preceding SF, whereby the value of the cryptographic hash function for each SF encodes information of at least the identifying data for all SFs from the packet source;
   including each current value of the cryptographic hash function in a metadata portion of the corresponding data packet;
   after computing the current value of the cryptographic hash function for a selected SF in the SFC, comparing the current value of the cryptographic hash function with an expected value; and
   when the value of the cryptographic hash function for the selected SF is the same as the expected value, transmitting the data packet to a subsequent processing stage;
   when the value of the cryptographic hash function for the selected SF is not the same as the expected value, taking an error response action.

2. The method of claim 1, in which the subsequent processing stage is the packet destination.

3. The method of claim 1, further comprising inserting the current value of the cryptographic hash function into a header of the corresponding data packet.

4. The method of claim 1, further comprising:
   determining within a control plane component all expected cryptographic hash function values for the packet for all SFs at least up to the current SFs;
   including within the packet, at each SF, a set of expected cryptographic hash function values computed at each previous SF; and
   determining a point of deviation from the specified SFC by comparing actual cryptographic hash function values computed at each SF with the set of expected cryptographic hash function values.

5. The method of claim 1, further comprising:
   determining within a control plane component all expected cryptographic hash function values for the packet for all SFs at least up to the current one of the SFs; and
   determining a point of deviation from the specified SFC by comparing actual cryptographic hash function values computed at each SF with the set of expected values.

6. The method of claim 1, in which the selected SF is a final SF before the packet destination.

7. The method of claim 1, in which the selected SF is an intermediate SF comprising a processing stage between the packet source and a final SF, which is immediately before the packet destination in the SFC.

8. The method of claim 1, in which the error response action is blocking of the data packet from transmission to a subsequent SF or the packet destination.

9. The method of claim 1, in which the error response action is retransmission of the data packet starting again with the packet source.

10. The method of claim 1, in which at least one of the nodes is a physical server.

11. The method of claim 1, in which at least one of the nodes is a router.

12. The method of claim 1, in which at least one of the nodes is a telephone transmission system.

13. The method of claim 1, in which at least one of the nodes is virtualized.

14. The method of claim 1, in which the SFC includes at least one parallel SF path.

15. A system for controlling the transmission of data packets over a network from a packet source to a packet destination, comprising:
   a plurality of nodes;
   a control plane including at least one network controller, said control plane specifying a service function chain (SFC) that includes an ordered sequence of at least one service function (SF), each SF corresponding to a packet processing stage, said node being provided for processing the at least one SF;

a plurality of nodes, each including means for carrying out at least one of the SFs and, for each SF in the SFC in order, for recursively computing a current value of a cryptographic hash function of both at least current identifying data that identifies a corresponding current one of the SFs, and a value of the cryptographic hash function output from an immediately preceding SF, whereby the value of the cryptographic hash function for each SF encodes information of at least the identifying data for all SFs from the packet source;

said control plane being provided for including each current value of the cryptographic hash function in a metadata portion of the corresponding data packet;

means for comparing the current value of the cryptographic hash function with an expected value after the current value of the cryptographic hash function for a selected SF in the SFC is computed; and when the value of the cryptographic hash function for the selected SF is the same as the expected value, for transmitting the data packet to a subsequent processing stage;

when the value of the cryptographic hash function for the selected SF is not the same as the expected value, for taking an error response action.

16. The system of claim 15, in which the subsequent processing stage is the packet destination.

17. The system of claim 15, in which the control plane is provided for including each current value of the cryptographic hash function in a metadata portion of the corresponding data packet.

18. The system of claim 17, in which the control plane is provided for inserting the current value of the cryptographic hash function into a header of the corresponding data packet.

19. The system of claim 15, in which the control plane is provided:

for determining all expected cryptographic hash function values for the packet for all SFs at least up to the current SFs;

for including within the packet, at each SF, a set of expected function values computed at each previous SF; and for determining a point of deviation from the specified SFC by comparing actual cryptographic hash function values computed at each SF with the set of expected cryptographic hash function values.

20. The system of claim 15, further comprising:

determining all expected values for the packet for all SFs at least up to the current one of the SFs; and determining a point of deviation from the specified SFC by comparing actual function values computed at each SF with the set of expected values.

21. The system of claim 15, in which the selected SF is a final SF before the packet destination.

22. The system of claim 15, in which the selected SF is an intermediate SF comprising a processing stage between the packet source and a final SF, which is immediately before the packet destination in the SFC.

23. The system of claim 15, in which the error response action is blocking of the data packet from transmission to a subsequent SF or the packet destination.

24. The system of claim 15, in which the error response action is retransmission of the data packet starting again with the packet source.

25. The system of claim 24, in which at least one of the nodes is a physical server.

26. The system of claim 24, in which at least one of the nodes is a router.

27. The system of claim 24, in which at least one of the nodes is a telephone transmission system.

28. The system of claim 24, in which at least one of the nodes is virtualized.

29. The system of claim 15, in which the SFC includes at least one parallel SF path.

* * * * *